United States Patent [19]
Chinen

[11] Patent Number: 6,099,929
[45] Date of Patent: Aug. 8, 2000

[54] COVERING PROTECTIVE DEVICE, BEARING ADVERTISING INDICIA FOR A COMPUTER MOUSE

[76] Inventor: Arturo Oscar Chinen, Kitano Cho 559-6 Nihon Suisankk Danshiryo 405 (T-192), Tokyo To Hachioji Shi, Japan

[21] Appl. No.: 09/190,399

[22] Filed: Nov. 11, 1998

[30] Foreign Application Priority Data

Mar. 30, 1998 [AR] Argentina ............... M98-01-01437

[51] Int. Cl.$^7$ ................................. G06F 3/033
[52] U.S. Cl. ............... 428/40.1; 248/205.3; 248/346.01; 248/918; 345/156; 345/163; 428/41.7; 428/41.8; 428/42.1; 428/43; 428/194
[58] Field of Search ............... 428/40.1, 41.7, 428/41.8, 42.1, 43, 194; 345/156, 163; 248/205.3, 346.01, 918

[56] References Cited

FOREIGN PATENT DOCUMENTS

| 29617262 U | 2/1997 | Germany . |
| 29812710 U | 9/1998 | Germany . |
| 409319515A | 12/1997 | Japan . |

Primary Examiner—Nasser Ahmad
Attorney, Agent, or Firm—Cowan, Liebowitz & Latman, P.C.; Morey B. Wildes; William H. Dippert

[57] ABSTRACT

A covering protective device for use in a manually operated mouse for computers has a flexible material sheet with an adhesive strip on the bottom surface thereof to allow the sheet to be removably, adhesively fixed onto an upper surface of the body portion of the mouse, whereby the flexible sheet is retained on the mouse with a free distal portion of the sheet extending over depressible keys of the mouse, the sheet also containing indicia bearing information, advertising or other legends.

12 Claims, 1 Drawing Sheet

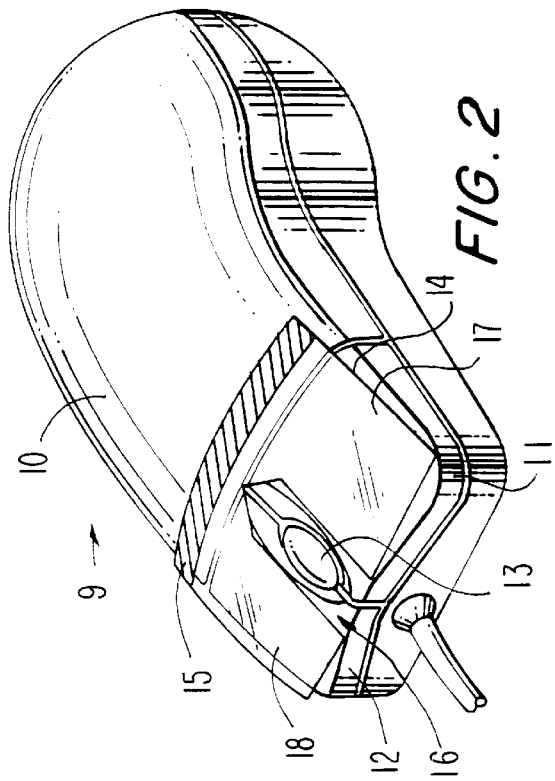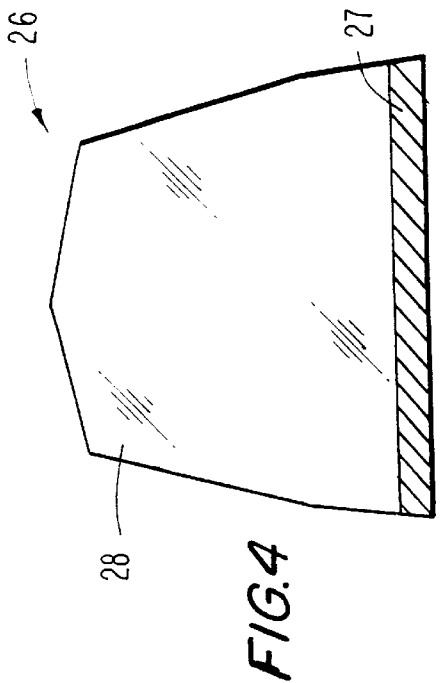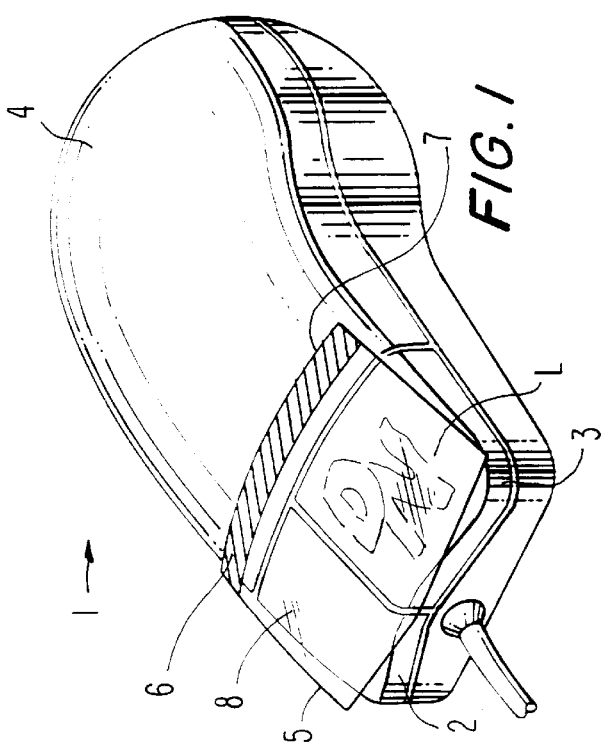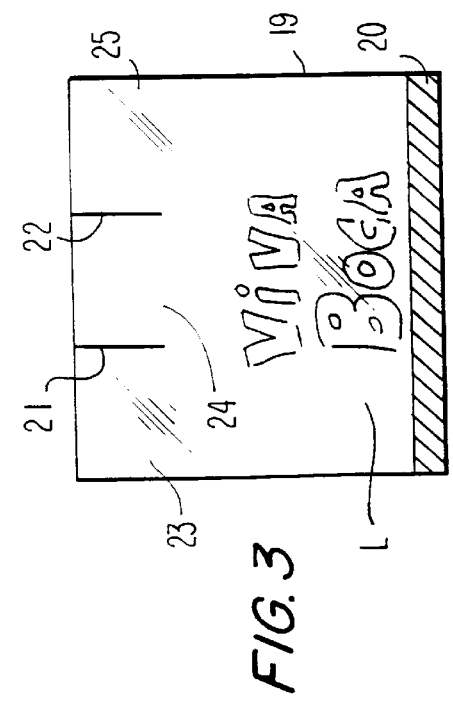

COVERING PROTECTIVE DEVICE, BEARING ADVERTISING INDICIA FOR A COMPUTER MOUSE

BACKGROUND OF THE INVENTION

The present invention relates to the field of computer accessories and, more particularly, relates to a protective device for use with a manually operated actuator for computers, popularly known as a "mouse", wherein the inventive device is to be used for protecting the mouse and for bearing any kind of useful indicia, such as indications relating to the computer functions, programs and advertisements, particularly a protective advertising device for promotion purposes.

For the purposes of the present specification, the term "mouse" is to be understood as meaning the popularly known device having depressible keys for operating computers, the term "indicia" is to be understood as meaning one or more of any kind of legend, notice, logo, drawing and word for providing instructions, indications and advertisements, and the term "sheet" is be understood as meaning any type of laminar body that is capable of being at least partially fixed onto the mouse and having a flexible free portion.

The computer mouse is a well known device that is widely used in the operation of computers. Many mouse designs have been developed either from an ornamental point of from a functional point of view, or both, in order to facilitate the operation of the mouse. However, all of the most popular mouse devices have a proximal or rear body portion that is adapted to be placed under the palm of the user's hand and a leading or distal portion including depressible keys that is adapted to be placed under the fingers of the user's hand. The most sensitive parts of this device are a track ball located within the body portion and the lever mounting system of the depressible keys. However, the keys, in particular, are extremely vulnerable to the entry of dust and grease from the user's hand and from the environment. Therefore, It would be desirable to have some sort of protection for at least one of these parts.

In another aspect, the mouse is an element that is always in a position close to the computer, such as on the upper surface of a desk that is adjacent to the computer, and is thus exposed and visible to the computer operator as well as visible to any others who happen to be circulating near the computer. Therefore, It would be desirable to take advantage of the high visibility of the mouse by calling the attention of the user and others nearby for many purposes such as instructions, warnings or advertisements.

It would be convenient, therefore, to provide a device that combines the necessary features in order to provide a protective effect on a mouse and, at the same time, bear indicia containing indications, guidelines and the like for operating the computer and/or advertisements.

SUMMARY OF THE INVENTION

It is, therefore, an object of the present invention to provide a device for use with a mouse, for covering at least the depressible keys of the mouse in order to prevent dust particles, dirt, grease and liquids from entering into the gaps defined between the keys and under the keys with the prejudicial effect this would cause to the operation of the mouse.

It is another object of the present invention to provide a device to be fixed onto a computer mouse with informational purposes. Such a device could comprise a laminar body having a fixing portion capable of being fixed onto the mouse and having a covering portion extending over the keys of the mouse and bearing indicia such as instructions, data, guidelines and the like relating to the computer and/or computer programs, and/or advertisements for promotion purposes.

It is a further object of the present invention to provide a covering protective device for use in a manually operated mouse for computers, the mouse including a proximal body portion and distal depressible keys adapted to be pressed by the fingers of an user, the device comprising a flexible material sheet having a top surface and a bottom surface, the bottom surface including an adhesive strip to be removably fixed onto an upper surface of the body portion of the mouse, whereby the flexible sheet is retained in the mouse with the sheet extending over the mouse keys, the sheet also containing indicia that is visible on the top surface of the flexible sheet.

BRIEF DESCRIPTION OF THE DRAWINGS

The above and other objects, features and advantages of this invention will be better understood upon consideration of the following detailed description of the preferred embodiments, taken in connection with the accompanying drawings, in which the reference characters refer to like parts throughout and in which:

FIG. 1 shows a perspective view of a mouse provided with a device according to a first embodiment of the invention;

FIG. 2 shows a perspective view of a mouse provided with a device according to a second embodiment of the invention;

FIG. 3 is a top plan view of a covering device according to a third embodiment of the invention; and FIG. 4 is a top plan view of a covering device according to a fourth embodiment of the invention.

DESCRIPTION OF THE PREFERRED EMBODIMENTS

Referring now in detail to the drawings, in particular to FIG. 1, a computer mouse identified by the general reference number 1 has a proximal or rear portion that defines a body portion with an upper surface 4 adapted to be taken under the palm of a user's hand, and a distal or leading portion including at least two depressible keys 2,3. The device of the invention comprises a laminar body or sheet 5, made of a flexible material, such as plastic or the like, and having a top surface visible to the user and a bottom surface facing in the direction of mouse 1 and fixed to upper surface 4 of mouse 1 through an adhesive strip 6 located on the bottom surface of sheet 5. Strip 6 comprises preferably an adhesive strip of the type having a peelable protective strap that can be easily removed to expose the adhesive to enable it to be fixed against upper surface 4 of mouse 1. This protective strap is formed with an adhesive tape that is very well known to any person skilled in the art. The adhesive strip is located at an edge 7 of a rear portion, or fixing portion of sheet 5, whereby the flexible sheet 5 is retained on mouse 1 with a free distal portion 8, which is the covering portion of sheet 5 that extends over mouse keys 2,3.

Sheet 5 may include, according to the concepts of the invention, any kind of indicia L, such as words, drawings, legends, data, indications, instructions relating to the computer or to its programs and operation, advertisements or the like. Indicia L may be incorporated within the material of sheet 5 or may be printed on either of the top and bottom surfaces of sheet 5. If sheet 5 is transparent, indicia L may preferably be printed on the bottom surface of sheet 5 such that indicia L is always visible through to the top surface of sheet 5. Thus, sheet 5 defines an indicia or advertisement that is displayed on the top surface of sheet 5. Sheet 5 has a preferred quadrangular shape in the first embodiment, as depicted in FIG. 1.

A second embodiment is illustrated in FIG. 2, wherein a mouse 9 includes keys 11,12 and a rotating key 13. Similar to the embodiment shown in FIG. 1, the protective device of the second embodiment of the invention comprises a sheet 14 with an adhesive strip 15 on its bottom surface for affixing sheet 14 to the upper surface 10 of mouse 9. Sheet 14, which may also have a quadrangular shape, is provided with a longitudinally extending central cut 16 so that rotating key 13 of mouse 9 is accessible to the user. Cut 16 defines two free longitudinal lateral tongues 17,18 that extend protectively over keys 11,12, respectively.

A third embodiment of the invention is depicted in FIG. 3, wherein the protective device comprises a square flexible laminar sheet 19 having an adhesive strip 20 on its bottom surface for affixing sheet 19 to the upper surface of the mouse. Sheet 19 also has longitudinal cuts 21,22 that define three free longitudinal tongues 23,24,25 to cover and extend protectively over three depressible keys of a mouse having three such keys (not shown). Sheet 19 is illustrated in FIG. 3 as bearing a logo L which may be incorporated within the sheet plastic material or alternatively may be printed on either of the top or bottom surfaces thereof.

A fourth embodiment of the invention is depicted in FIG. 4, wherein the device comprises a sheet 26 having a polygonal shape, with at least a partially trapezoidal configuration. In this embodiment, an adhesive strip 27 is located at the base of the trapezium or of the trapezoidal polygonal shape on the bottom surface of sheet 26 for affixing sheet 26 to the upper surface of the mouse. In this embodiment, the free and unaffixed end 28 of sheet 26 is shown as being entire and uninterrupted, i.e., without cuts like the ones shown in FIGS. 2 and 3. Sheet 26, however, may include cuts according to the particular design of the mouse on which sheet 26 is fixed.

Adhesive strips 7,15,20, 27 shown in FIGS. 1, 2, 3 and 4 on embodiments 1–4, respectively, may be formed by placing an appropriate adhesive on the bottom surface of the corresponding sheet, with a protective strap covering and protecting the adhesive until the sheet is applied to the mouse. Alternatively, an adhesive tape of the kind known as "mounting tape," including a peelable protective strap protecting the adhesive, may be used.

Thus, a covering protective device bearing advertising indicia for a computer mouse is provided. One skilled in the art will appreciate that, while preferred embodiments of the present invention have been illustrated and described, the present invention can be practiced by other than the described embodiments, which are provided for purposes of illustration and not limitation, and that that various changes and modifications may be made therein without departing from the scope of the invention as defined in the appended claims.

I claim:

1. A covering protective device for use in a manually operated mouse for computers, the mouse including a body proximal portion and distal depressible keys to be pressed by the fingers of an user, the device comprising a flexible material sheet having an top surface and an bottom surface, the bottom surface including an adhesive strip to be adhesively fixed onto an upper surface of the body portion of the mouse, whereby the flexible sheet is retained on the mouse with a free leading portion of the sheet extending over the mouse keys, the sheet also containing indicia that is visible on the outer surface of the flexible sheet.

2. The covering protective device of claim 1, wherein the flexible sheet has a rear portion that is fixable to the mouse and a leading portion extending over the keys of the mouse.

3. The covering protective device of claim 1, wherein the adhesive strip is located at a rear edge of the rear portion of the sheet.

4. The covering protective device of claim 1, wherein the adhesive strip is covered with a peelable protective strap capable of being removed to expose the adhesive strip for applying the same against the body of the mouse.

5. The covering protective device of claim 1, wherein the indicia is printed on the inner surface of the sheet and the flexible material is transparent, whereby the indicia can be seen from the outer surface of the covering sheet.

6. The covering protective device of claim 1, wherein the flexible material is opaque and the indicia is printed on the outer surface of the sheet, whereby the indicia can be seen from the outer surface of the covering sheet.

7. The covering protective device of claim 1, wherein the indicia is an advertising indicia.

8. The covering protective device of claim 1, wherein the sheet has a quadrangular shape.

9. The covering protective device of claim 1, wherein the sheet has a polygonal shape.

10. The covering protective device of claim 1, wherein the sheet has a trapezoidal shape.

11. A covering protective device for use in a manually operated mouse for computers, the mouse including a body proximal portion and distal depressible keys to be pressed by the fingers of an user, the device comprising a flexible material sheet having an top surface and an bottom surface, the bottom surface including an adhesive strip to be adhesively fixed onto an upper surface of the body portion of the mouse, whereby the flexible sheet is retained on the mouse with a free leading portion of the sheet extending over the mouse keys, wherein the sheet includes indicia that is visible on the outer surface of the flexible sheet and at least one longitudinal cut at the leading free portion of the sheet, defining longitudinal free tongues, each tongue extending over respective mouse keys.

12. A covering protective device for use in a manually operated mouse for computers, the mouse including a body proximal portion and distal depressible keys to be pressed by the fingers of an user, the device comprising a flexible material sheet having an top surface and an bottom surface, the bottom surface including an adhesive strip to be adhesively fixed onto an upper surface of the body portion of the mouse, whereby the flexible sheet is retained on the mouse with a free leading portion of the sheet extending over the mouse keys, wherein the sheet includes indicia that is visible on the outer surface of the flexible sheet and a plurality of longitudinal cuts defining longitudinal free tongues at the leading free portion of the sheet, each tongue extending over respective mouse keys.

\* \* \* \* \*